Patented Jan. 9, 1923.

1,441,612

UNITED STATES PATENT OFFICE.

NORMAN UNDERWOOD, OF OAKTON, VIRGINIA.

ART OF PREPARING CHROME PIGMENTS.

No Drawing.      Application filed June 9, 1922. Serial No. 567,173.

*To all whom it may concern:*

Be it known that I, NORMAN UNDERWOOD, a citizen of the United States, residing in Oakton, county of Fairfax, and State of Virginia, have invented certain new and useful Improvements in the Art of Preparing Chrome Pigments, of which the following is a full and complete specification.

Chrome pigments, of the nature of chrome red, have been prepared by treating sublimed lead, lead sulphate or other compounds of this metal with chromates of the alkali metals.

It is an object of my invention to produce a basic lead chromate of this type by a simple and economical process as will be readily understood from the following description. The compound of lead used in this process may vary according to conditions, the process being adapted for use of any of the common forms of lead which may be found suitable for suspension in water in a finely divided state. In like manner the lead may be an unrefined mixture of both the oxide and sulphate. The chromium is supplied in the form of a chromate or bichromate of an alkali metal which is dissolved in the water carrying the lead compound. The desired reaction between these compounds is brought about under the most favorable conditions by the addition to the mixture of a quantity of alkaline earth oxide or hydroxide in which classification for the purposes of satisfactorily carrying out this invention magnesium is included and in the following procedure magnesium hydroxide is cited as an example.

In one practical procedure of my invention finely divided sublimed lead or lead sulphate is suspended in water. This suspension is maintained during the operation by means of mechanical agitators or other agencies. A suitable quantity of potassium bichromate is dissolved in the water and brought into intimate contact with the lead sulphate. There is also added to this mixture the desired quantity of magnesium oxide or hydrate. The mixture is then boiled and thoroughly agitated. This results in the prompt reaction between the lead and the chromate, producing a most desirable form of basic lead chromate. The duration of the boiling and agitation is controlled by the shade of color produced and the reaction brought to a close when the color has reached the desired depth. The pigment is then filtered and washed. It may then be dried or mixed with oils in the customary manner. If the reaction is arrested before the entire amount of lead sulphate is transformed, the residual sulphate is carried over mechanically with the solid chrome pigment and has a corresponding effect on the color of the latter. It is sometimes found very desirable to compound the mixture of chrome pigment and lead sulphate in this manner and during the production of the chrome pigment.

The filtrate which contains the sulphates of magnesium and potassium is then made alkaline, for example by the addition of potassium hydroxide whereupon the magnesium hydroxide is recovered in solid form and may be separated for subsequent use with a fresh charge of lead and chromate. This leaves the alkali sulphate in relatively isolated condition in the filtrate.

In carrying out my process, I have taken for example eighteen parts of sublimed lead or lead sulphate; three parts potassium bichromate and 1.6 parts of magnesium oxide in sufficient water to suspend the solid materials. Minor variations in the proportions stated will suggest themselves to the operator where it is desired to cause corresponding changes in the color of the resulting pigment, and this pigment may include the excess of one or more ingredients over and above the amount necessary to produce the basic lead chromate itself. Furthermore, while the invention has been described in one form using potassium bichromate as an ingredient, yet the result desired can be obtained equally well if other equivalent alkali metal chromates such as sodium chromate are used in place of potassium bichromate.

What I claim is:

1. The art of preparing a chrome pigment which consists in reacting on a compound of lead suspended in water with an alkali metal chromate in the presence of the hydroxide or oxide of an alkaline earth metal.

2. The art of preparing a chrome pigment which consists in reacting on an insoluble compound of lead suspended in water, with an alkali metal chromate in the presence of the hydroxide of an alkaline earth metal.

3. The art of preparing a chrome pigment which consists in reacting on lead sulphate suspended in water with an alkali metal cromate in the presence of the hydroxide of an alkaline earth metal.

4. The art of preparing a chrome pigment which consists in reacting on a compound of lead suspended in water with potassium bichromate in the presence of the hydroxide of an alkaline earth metal.

5. The art of preparing a chrome pigment which consists in reacting on a compound of lead with potassium bichromate in the presence of magnesium hydroxide.

6. The art of preparing a chrome pigment which consists in reacting on an insoluble compound of lead suspended in water with potassium bichromate in the presence of hydroxide of an alkaline earth metal.

7. The art of preparing a chrome pigment which consists in reacting on lead sulphate suspended in water with potassium bichromate in the presence of the hydroxide of an alkaline earth metal.

8. The art of preparing a chrome pigment which consists in reacting on lead sulphate suspended in water with potassium bichromate in the presence of magnesium hydroxide.

9. The art of preparing a pigment by suspending and agitating lead sulphate and magnesium hydroxide in an aqueous solution potassium of bichromate.

10. The art of preparing a chrome pigment which consists in agitating in boiling water a quantity of a compound of lead with an alkali metal chromate in the presence of magnesium hydroxide, filtering the pigment so produced and recovering from the filtrate the magnesium as an hydroxide for use with a fresh quantity of lead compound by rendering the filtrate alkaline.

11. The art of preparing a chrome pigment which consists in agitating in a solution of an alkali metal chromate, magnesium hydroxide and an insoluble compound of lead, and subsequently collecting the mixed chrome pigment and excess lead compound.

In testimony whereof, I have hereunto affixed my signature.

NORMAN UNDERWOOD.